US012792317B2

(12) United States Patent
Lin et al.

(10) Patent No.: US 12,792,317 B2
(45) Date of Patent: Nov. 10, 2026

(54) MULTI-LEVEL GRAPH PROGRAMMING INTERFACES FOR CONTROLLING IMAGE PROCESSING FLOW ON AI PROCESSING UNIT

(71) Applicant: MediaTek Inc., Hsinchu City (TW)

(72) Inventors: Yu-Chieh Lin, Hsinchu City (TW); Hungchun Liu, Hsinchu City (TW); Po-Yuan Jeng, Hsinchu City (TW); Yungchih Chiu, Hsinchu City (TW); Cheng-Hsun Hsieh, Hsinchu City (TW); Chia-Yu Chang, Hsinchu City (TW); Li-Ming Chen, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 74 days.

(21) Appl. No.: 18/178,098

(22) Filed: Mar. 3, 2023

(65) Prior Publication Data

US 2023/0342118 A1 Oct. 26, 2023

Related U.S. Application Data

(60) Provisional application No. 63/355,143, filed on Jun. 24, 2022, provisional application No. 63/334,728, filed on Apr. 26, 2022.

(51) Int. Cl.
*G06F 8/41* (2018.01)
*G06F 8/30* (2018.01)
*G06F 8/36* (2018.01)

(52) U.S. Cl.
CPC .................. *G06F 8/36* (2013.01); *G06F 8/31* (2013.01); *G06F 8/41* (2013.01); *G06F 8/433* (2013.01)

(58) Field of Classification Search
None
See application file for complete search history.

(56) References Cited

U.S. PATENT DOCUMENTS

| | | | | |
|---|---|---|---|---|
| 7,159,183 B1 * | 1/2007 | Kudukoli | ................ | H04L 67/12 715/967 |
| 8,826,255 B1 * | 9/2014 | Avadhanula | ............ | G06F 8/433 717/154 |

(Continued)

OTHER PUBLICATIONS

Giduthuri, Intel, The Khronos OpenVX Working Group "The OpenVX Specification" v 1.3.1, Feb. 2022.*

(Continued)

*Primary Examiner* — Jason D Mitchell
(74) *Attorney, Agent, or Firm* — Tong J. Lee

(57) ABSTRACT

A graph application programming interface (API) is used to control an image processing flow. A system receives graph API calls to add nodes to respective subgraphs. The system further receives a given graph API call to add a control flow node to a main graph. The given graph API call identifies the subgraphs as parameters. The main graph includes the control flow node connected to other nodes by edges that are directed and acyclic. A graph compiler compiles the main graph and the subgraphs into corresponding executable code. At runtime, a condition is evaluated before the subgraphs identified in the given graph API call are executed. One or more target devices execute the corresponding executable code to perform operations of an image processing pipeline while skipping execution of one or more of the subgraphs depending on the condition.

14 Claims, 8 Drawing Sheets

(56) References Cited

U.S. PATENT DOCUMENTS

| | | | | |
|---|---|---|---|---|
| 10,262,438 | B2 * | 4/2019 | Mitrea | G06T 9/001 |
| 10,546,405 | B2 | 1/2020 | Herman | |
| 10,685,295 | B1 * | 6/2020 | Ross | G06F 9/5083 |
| 2007/0016615 | A1 * | 1/2007 | Mohan | G06F 8/20 |
| 2008/0109779 | A1 * | 5/2008 | Moriat | G06F 30/331 716/139 |
| 2016/0210724 | A1 | 7/2016 | Taylor | |
| 2018/0136912 | A1 * | 5/2018 | Venkataramani | G06N 3/048 |
| 2019/0037097 | A1 * | 1/2019 | Giduthuri | G06T 1/20 |
| 2020/0026711 | A1 * | 1/2020 | Blom | G06F 8/34 |
| 2020/0310766 | A1 * | 10/2020 | Haehnle | G06F 8/30 |
| 2021/0382754 | A1 * | 12/2021 | Nimmagadda | G06N 3/08 |
| 2021/0383026 | A1 * | 12/2021 | Nimmagadda | H04L 9/50 |
| 2022/0164169 | A1 * | 5/2022 | Lee | G06F 8/41 |
| 2022/0197692 | A1 * | 6/2022 | Simpson | G06N 20/00 |
| 2022/0360545 | A1 * | 11/2022 | Mingels | G06F 40/166 |
| 2022/0375033 | A1 * | 11/2022 | Suzuki | G06N 3/0464 |
| 2023/0051050 | A1 * | 2/2023 | Grover | G06N 3/063 |
| 2023/0222010 | A1 * | 7/2023 | Jones | G06F 9/54 719/328 |
| 2023/0342118 | A1 * | 10/2023 | Lin | G06F 8/36 |
| 2023/0342876 | A1 * | 10/2023 | Lin | G06T 11/206 |

OTHER PUBLICATIONS

M. Akif Ozkan et al: “HipaccVX: Wedding of OpenVX and DSL-based Code Generation,” arXiv:2008.11476v1 [cs. CV], Aug. 26, 2020.
Li Da et al: “GRapid: a Compilation and Runtime Framework for Rapid Prototyping of Graph Applications on Many-core Processors,” Proc. of the 20th IEEE International Conference on Parallel and Distributed Systems (ICPADS 2014), Hsinchu, Taiwan, Dec. 2014.
The Extended European Search Report, Application #23169090, mailed Oct. 4, 2023.
Communication from the European Patent Office (Application No. EP 23 169 091.8) mailed Apr. 8, 2025.
Khronos AR and VR standards, Jan. 18, 2025.
Anonymous, “Node Graph Architecture—Wikipedia”, Mar. 9, 2022.

* cited by examiner

MULTI-LEVEL GRAPH PROGRAMMING INTERFACES FOR CONTROLLING IMAGE PROCESSING FLOW ON AI PROCESSING UNIT

CROSS-REFERENCE TO RELATED APPLICATIONS

This application claims the benefit of U.S. Provisional Application No. 63/334,728 filed on Apr. 26, 2022, and U.S. Provisional Application No. 63/355,143 filed on Jun. 24, 2022, the entirety of both which is incorporated by reference herein.

TECHNICAL FIELD

Embodiments of the invention relate to a graph application programming interface (API) that simplifies and accelerates the deployment of a computer vision application on target devices.

BACKGROUND OF THE INVENTION

Graph-based programming models have been developed to address the increasing complexity of advanced image processing and computer vision problems. A computer vision application typically includes pipelined operations that can be described by a graph. The nodes of the graph represent operations (e.g., computer vision functions) and the directed edges represent data flow. Application developers build a computer vision application using a graph-based application programming interface (API).

Several graph-based programming models have been designed to support image processing and computer vision functions on modern hardware architectures, such as mobile and embedded system-on-a-chip (SoC) as well as desktop systems. Many of these systems are heterogeneous that contain multiple processor types including multi-core central processing units (CPUs), digital signal processors (DSPs), graphics processing units (GPUs), vision processing units (VPUs), and the like. The OpenVX™ 1.3.1 specification released in February 2022 by the Khronos Group, is one example of a graph-based programming model for computer vision applications. OpenVX provides a graph-based API that separates the application from the underlying hardware implementations. OpenVX is designed to maximize function and performance portability across diverse hardware platforms, providing a computer vision framework that efficiently addresses current and future hardware architectures with minimal impact on applications.

As mentioned before, OpenVX improves the performance and efficiency of computer vision applications by providing an API as an abstraction for commonly-used vision functions. These vision functions are optimized to significantly accelerate their execution on target hardware. Hardware vendors implement graph compilers and executors that optimize the performance of computer vision functions on their devices. Through the API (e.g., the OpenVX API), application developers can build computer vision applications to gain the best performance without knowing the underlying hardware implementation. The API enables the application developers to efficiently access computer vision hardware acceleration with both functional and performance portability. However, existing APIs can be cumbersome to use for certain computer vision applications. Thus, there is a need to further enhance the existing APIs to ease the tasks of application development.

SUMMARY OF THE INVENTION

In one embodiment, a method is provided for controlling an image processing flow. The method comprises the steps of receiving graph application programming interface (API) calls to add nodes to respective subgraphs; and receiving a given graph API call to add a control flow node to a main graph. The given graph API call identifies the subgraphs as parameters, and the main graph includes the control flow node connected to other nodes by edges that are directed and acyclic. The method comprises the steps of compiling, by a graph compiler, the main graph and the subgraphs into corresponding executable code, and evaluating a condition at runtime before executing the subgraphs identified in the given graph API call. One or more target devices then executes the corresponding executable code to perform operations of an image processing pipeline while skipping execution of one or more of the subgraphs depending on the condition.

In another embodiment, a system is operative to control an image processing flow. The system includes one or more processors, one or more target devices, and a memory coupled to the one or more processors and the one or more target devices. The one or more processors receive graph API calls to add nodes to respective subgraphs, and further receive a given graph API call to add a control flow node to a main graph. The given graph API call identifies the subgraphs as parameters, and the main graph includes the control flow node connected to other nodes by edges that are directed and acyclic. A graph compiler compiles the main graph and the subgraphs into corresponding executable code. The graph compiler and the corresponding executable code are stored in the memory. The one or more target devices perform operations of an image processing pipeline. The one or more target devices are operative to evaluate a condition at runtime before executing the subgraphs identified in the given graph API call, and execute the corresponding executable code to perform operations of an image processing pipeline while skipping execution of one or more of the subgraphs depending on the condition.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a graph application programming interface (API) that extends the API provided by OpenVX to enable a software developer to create a multi-level graph describing an image processing pipeline. Through the graph API, a software developer can call image processing functions implemented on target devices. The image processing functions may include computer vision operations used by an image processing application. The multi-level graph includes nodes corresponding to operations and edges representing dependencies among the nodes. The edges are directed and acyclic. At least one of the nodes in the graph is a control flow node, which corresponds to a starting point of a conditional operation such as an if-then-else operation, a switch operation, a while loop operation, and the like. Attached to the control flow node are a number of subgraphs. As an example, the subgraph corresponding to a "true" condition is executed. The execution of one or more of the other subgraphs may be skipped.

In the OpenVX programming model, a graph is composed of nodes that are added to the graph through node creation functions. A node may represent a computer vision function associated with parameters. Nodes are linked together via data dependencies. Data objects are processed by the nodes. The graph API disclosed herein extends the OpenVX API with respect to control flow processing.

Figure 1:
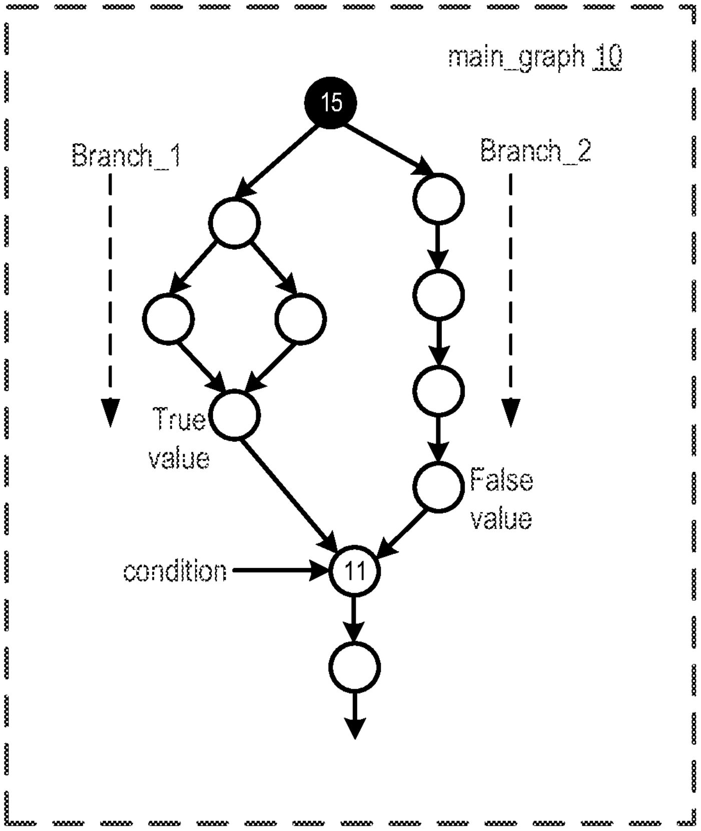
FIG. 1 Related Art
FIG. 1 illustrates a control flow diagram according to APIs provided by OpenVX.

FIG. 1 illustrates a control flow diagram according to APIs provided by OpenVX. The diagram includes a main_graph 10, in which every node is executed at runtime. Graph 10 is an example of a graph model that represents a series of imaging operations and their connections. The series of imaging operations form an image processing pipeline. Graph 10 includes multiple nodes (indicated by circles) with each node corresponding to one or more operations. The edges (indicated by arrows) of graph 10 connect the nodes and define the data flow. Graph 10 is directed and acyclic; that is, the edges of graph 100 only go one-way and do not loop back. Graph 10 includes two branches, both of which are executed at runtime. The two branches fork at a head node 15 and re-join at a select node 11. Select node 11 selects one of the two results as output based on the condition (e.g., a Boolean scalar). Executing the unselected branch is a waste of computational power and decreases system performance.

By contrast, the graph API disclosed herein enables a software developer to add a control flow node to a graph with subgraphs attached to the control flow node. Through the graph API, the software developer can specify the processing flows using graph programming. A graph compiler compiles the program into command blocks for runtime execution. During execution, not every subgraph is executed. Depending on a condition evaluated at runtime, the execution of one or more of the subgraphs may be skipped. Thus, the graph API can reduce unnecessary computations and improve system performance.

Figure 2:
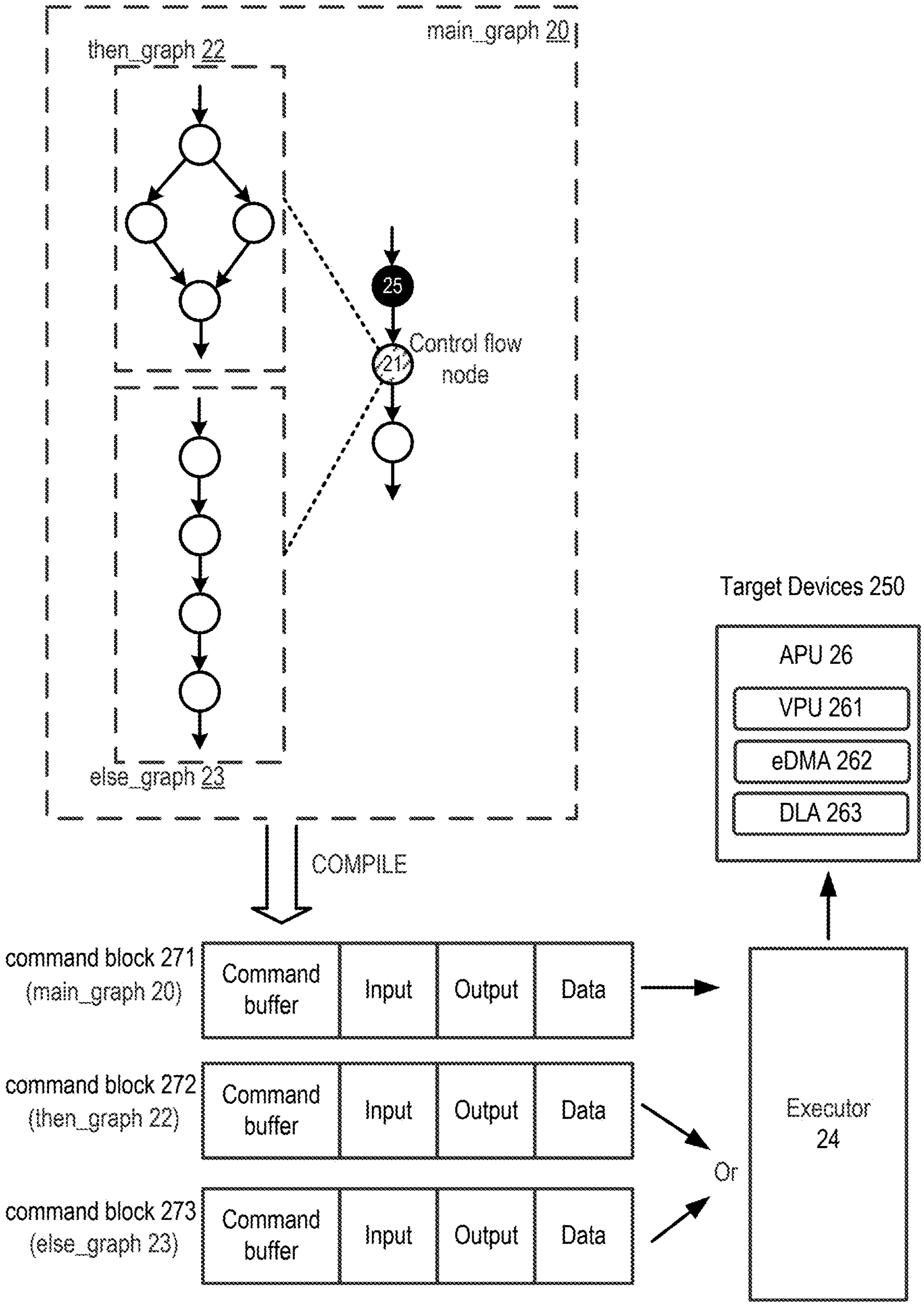
FIG. 2 is a diagram illustrating a multi-level graph for an if-then-else operation according to one embodiment.

FIG. 2 is a diagram illustrating a multi-level graph for an if-then-else operation according to one embodiment. The multi-level graph is referred to as a main_graph 20, which includes a control flow node 21 created by the graph API disclosed herein. Attached to control flow node 21 are a then_graph 22 and an else_graph 23. In this disclosure, the graphs attached to a control flow node may be referred to as subgraphs. Each node is indicated by a circle and corresponds to one or more operations. The edges (indicated by arrows) are directed and acyclic. Each operation may be a function selected, for example, from a library of image processing functions, neural network functions, customer-defined functions, functions provided by hardware vendors, or other types of functions. Control flow node 21 is added to main_graph 20 with parameters that include then_graph 22 and else_graph 23. Control flow node 21 may receive input from a head node 25, which corresponds to head node 15 in FIG. 1. The output of control flow node 21 is the selected subgraph (e.g., then_graph 22 or else_graph 23). In one embodiment, each of main_graph 20, then_graph 22, and else_graph 23 is an OpenVX graph; in alternative embodiments, one or more of graphs 20, 22, and 23 may be built according to a graph-based programming model different from OpenVX.

A graph compiler compiles main_graph 20, then_graph 22, and else_graph 23 into machine-executable command blocks 271, 272, and 273, respectively. An executor 24 schedules the execution of command blocks 271, 272, and 273 on target devices 250 according to a condition evaluated at runtime. The condition may be evaluated or received by control flow node 21. Depending on the condition, either then_graph 22 or else_graph 23 is executed by the target devices 250. A non-limiting example of target devices 250 may be an artificial intelligence (AI) processing unit (APU) 26, which may include a vision processing unit (VPU) 261, an enhanced direct memory access (eDMA) device 262, a deep learning accelerator (DLA) 263, and the like.

During execution, data objects such as input data, output data, and intermediate data, may be stored in temporary buffers accessible to the target devices. A central processing unit (CPU) may invoke the execution of an image processing pipeline (e.g., represented by main_graph 20) and receive the output of the image processing pipeline. The CPU does not invoke the execution of each individual operation in the image processing pipeline. Thus, the overhead caused by the interaction between the CPU and the target devices is significantly reduced during the execution of the image processing pipeline.

Figure 3:
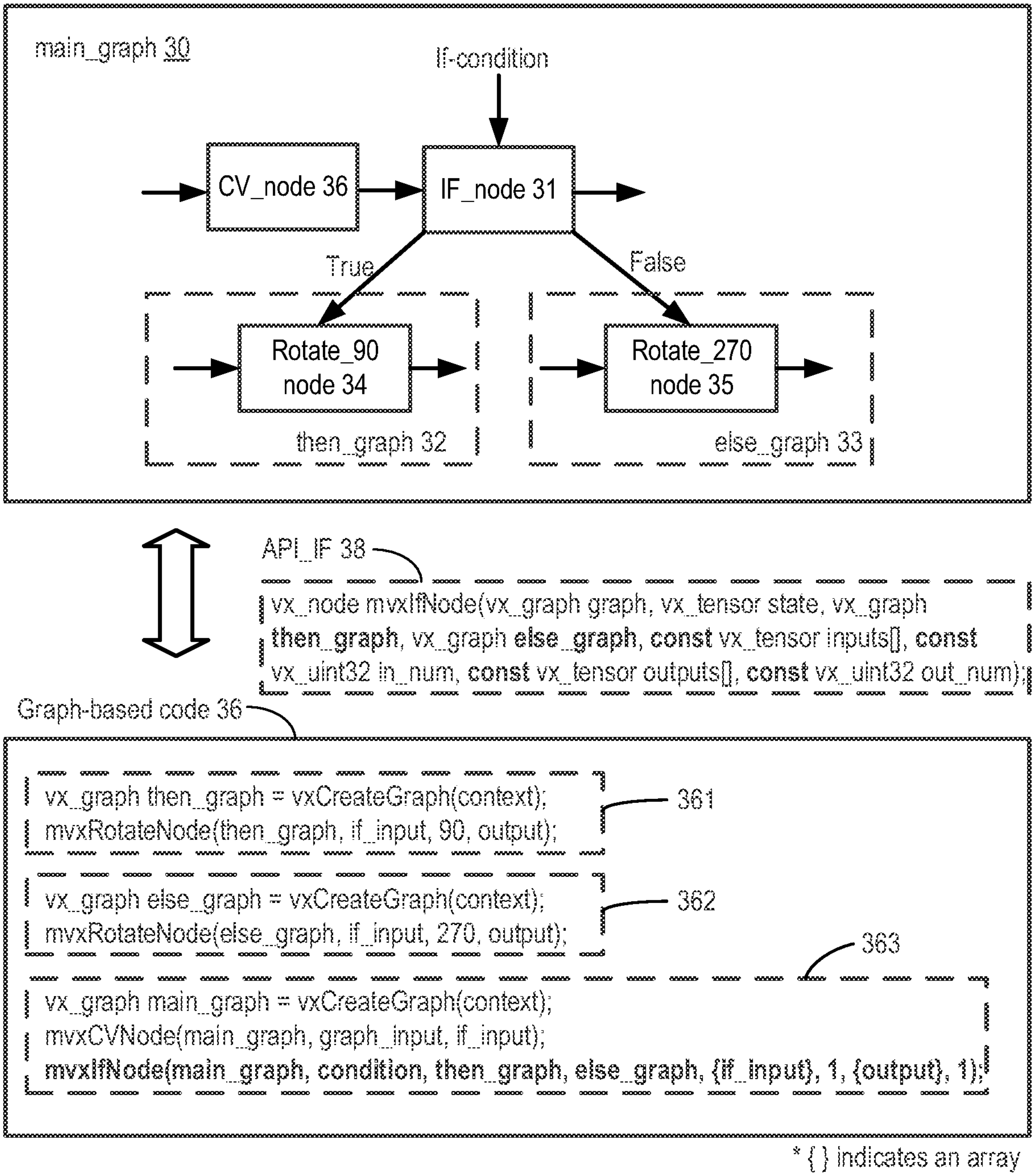
FIG. 3 illustrates an example of graph-based code that creates an IF_node according to one embodiment.

FIG. 3 illustrates an example of graph-based code 36 that calls API_IF 38 to create an IF_node 31 according to one embodiment. API_IF 38 is provided by the graph API disclosed herein. In the upper half of FIG. 3 is a main_graph 30 that includes IF_node 31 as a control flow node. IF_node 31 receives an input (e.g., an input image) from a CV_node 36 that performs a computer vision (CV) operation. IF_node 31 also receives a condition (also referred to as an if-condition), or receives additional input for evaluating the if-condition. Attached to IF_node 31 are then_graph 32 and else_graph 33. Then_graph 32 includes a rotate_90 node 34, which is executed when the if-condition is true. Else_graph 33 includes a rotate_270 node 35, which is executed when the if-condition is false. Depending on the if-condition, the input image is either rotated 90 degrees by rotate_90 node 34, or rotated 270 degrees by rotate_270 node 35. Depending on the if-condition, the output of IF_node 31 is the output of then_graph 32 or else_graph 33.

In the lower half of FIG. 3 is an example of graph-based code 36 for constructing main_graph 30, then_graph 32, and else_graph 33. Code segment 361 shows the construction of then_graph 32 and rotate_90 node 34; code segment 362 shows the construction of else_graph 33 and rotate_270 node 35; and code segment 363 shows the construction of main_graph 30, IF_node 31, and CV_node 36. The last line of code segment 363 is an API call according to API_IF 38 provided by the graph API disclosed herein. More specifically, the last line of code segment 363 uses API_IF 38 to add IF_node 31 to main_graph 30 with parameters that include then_graph 32 and else_graph 33. As mentioned with reference to FIG. 2, each time the processing flow proceeds to IF_node 31, only one of the subgraphs (32 or 33) is executed and the other subgraph is skipped.

The if-then-else operation in FIG. 2 and FIG. 3 can be extended to other conditional operations. For example, more than two subgraphs may be attached to IF_node 31, with each subgraph corresponding to a value of a switch-condition. Depending on the switch-condition evaluated at runtime, only one of the subgraphs is executed each time the processing flow proceeds to IF_node 31.

Figure 4:
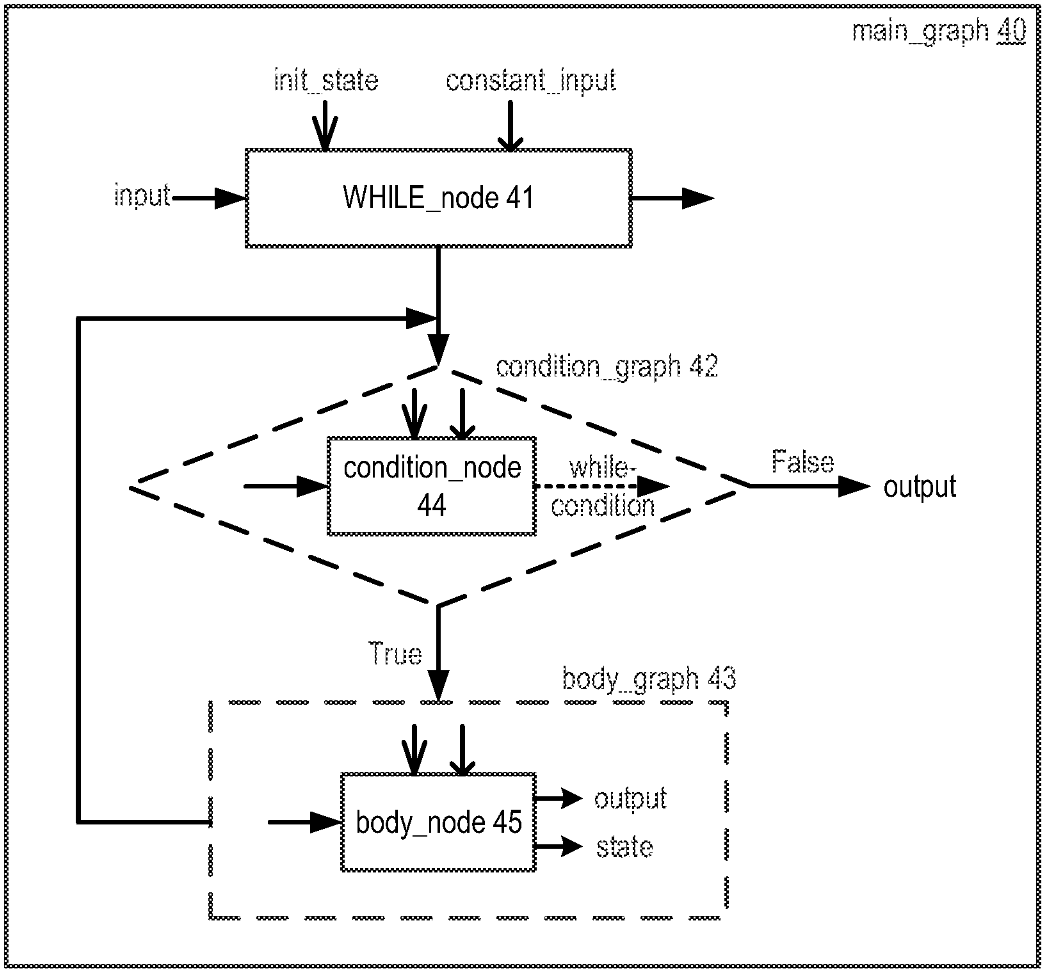
FIG. 4 is a diagram illustrating a multi-level graph for a while-loop operation according to one embodiment.

FIG. 4 is a diagram illustrating a multi-level graph for a while-loop operation according to one embodiment. The multi-level graph is referred to as a main_graph 40, which includes a WHILE_node 41 as a control flow node. WHILE_node 41 receives an initial state (init_state), a constant (constant_input), and an input (e.g., an input image) from a previous node in main graph 40. WHILE_node 41 is added to main_graph 40 with a condition_graph 42 and a body_graph 43 as parameters. In this embodiment, both condition_graph 42 and body_graph 43 receive the same initial state (init_state) and the constant (constant_input) as WHILE_node 41. Condition_graph 42 includes a condition_node 44, which evaluates its inputs and outputs a condition (also referred to as a while-condition). When the while-condition is true, the process flows to body_graph 43. Body_graph 43 includes a body_node 45, which evaluates its inputs and produces a state and an output. Body_node 45 returns the state and the output to condition_node 44 for condition evaluation in the next iteration of the while loop. The while loop terminates when the condition is false. At this point, the output of body_node 45 from the last iteration becomes the output of WHILE_node 41.

Figure 5:
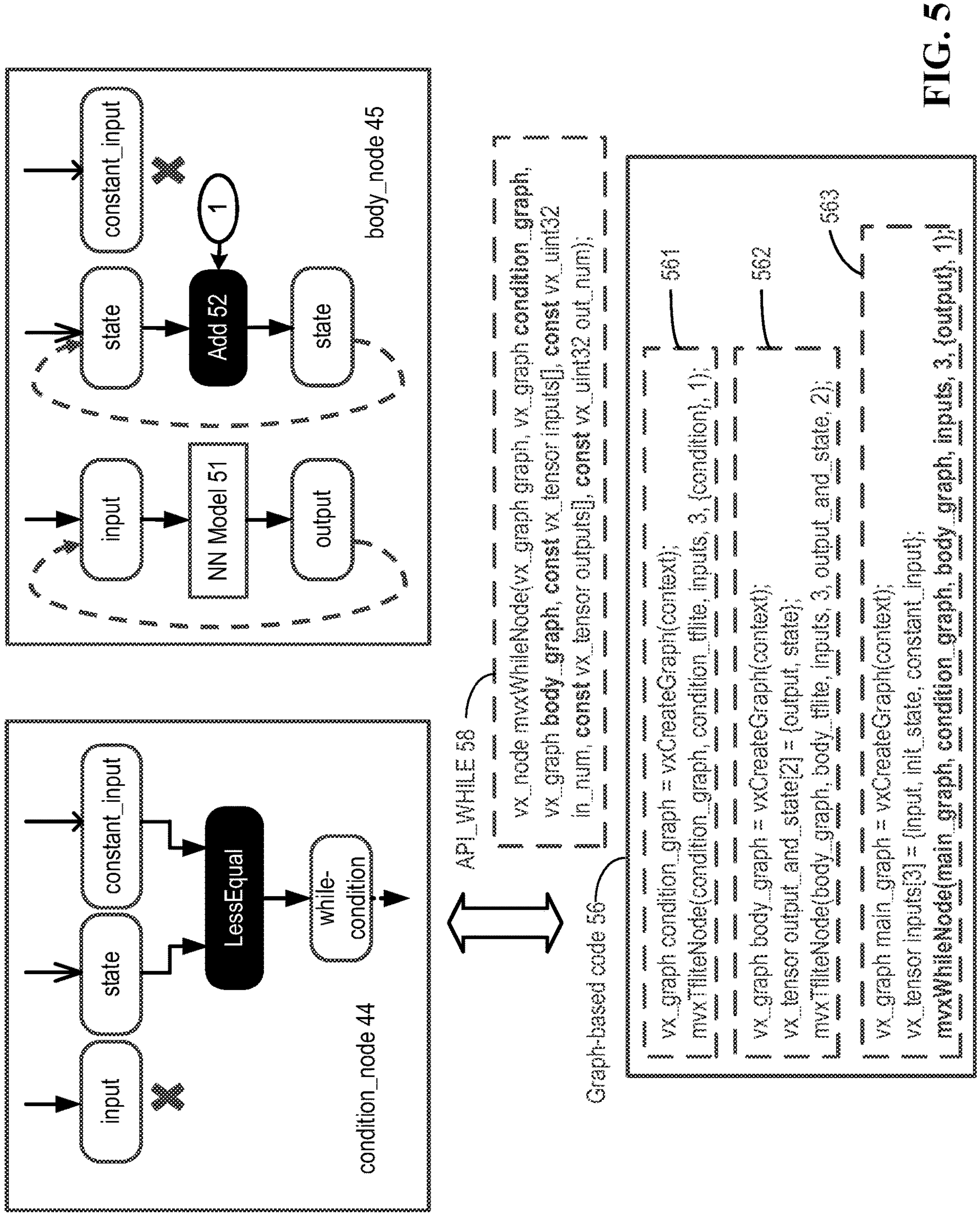
FIG. 5 illustrates further details of a while-loop operation and an example of graph-based code according to one embodiment.

FIG. 5 illustrates further details of the while-loop operation and an example of graph-based code 56 according to one embodiment. Graph-based code 56 calls API_WHILE 58 to create WHILE_node 41 in FIG. 4. API_WHILE 58 is provided by the graph API disclosed herein. The top portion of FIG. 5 shows the operations of condition_node 44 and body_node 45. In this example, condition_node 44 does not operate on the input. Condition_node 44 compares the values of the state and the constant_input and generates a while-condition (e.g., true or false) based on the comparison outcome. Body_node 45 is invoked when the while-condition is true. In this example, body_node 45 receives the input and processes the input using a neural network (NN) model 51 to generate an output. In one embodiment, the NN model 51 may be a multi-layered NN model. Body_node 45 increments the state by one in each iteration and sends the updated state to condition_node 44 for condition evaluation. The constant_input is not used by body_node 45.

The lower half of FIG. 5 shows an example of graph-based code 56 for constructing main_graph 40, condition_graph 42, and body_graph 43. Code segment 561 shows the construction of condition_graph 42 and condition_node 44 (e.g., condition_tflite); code segment 562 shows the construction of body_graph 43 and body_node 45 (e.g., body_tflite); and code segment 563 shows the construction of main_graph 40 and WHILE_node 41. The last line of code segment 563 is an API call according to API_WHILE 58 provided by the graph API disclosed herein. More specifically, the last line of code segment 563 uses API_WHILE 58 to add WHILE_node 41 to main_graph 40 with parameters including condition_graph 42 and body_graph 43. A graph compiler compiles main_graph 40, condition_graph 42, and body_graph 43 into machine-executable command blocks for execution on target devices according to a condition evaluated at runtime.

The graphs and subgraphs in FIG. 2-FIG. 5 may be OpenVX graphs. Alternatively, the graphs and subgraphs in FIG. 2-FIG. 5 may include a combination of OpenVX graphs and graphs that are built according to one or more graph-based programming models different from OpenVX. For example, body_graph 43 includes body_node 45, which encapsulates neural network model node 51 in TensorFlow-Lite and an adder node 52 in OpenVX.

Figure 6:
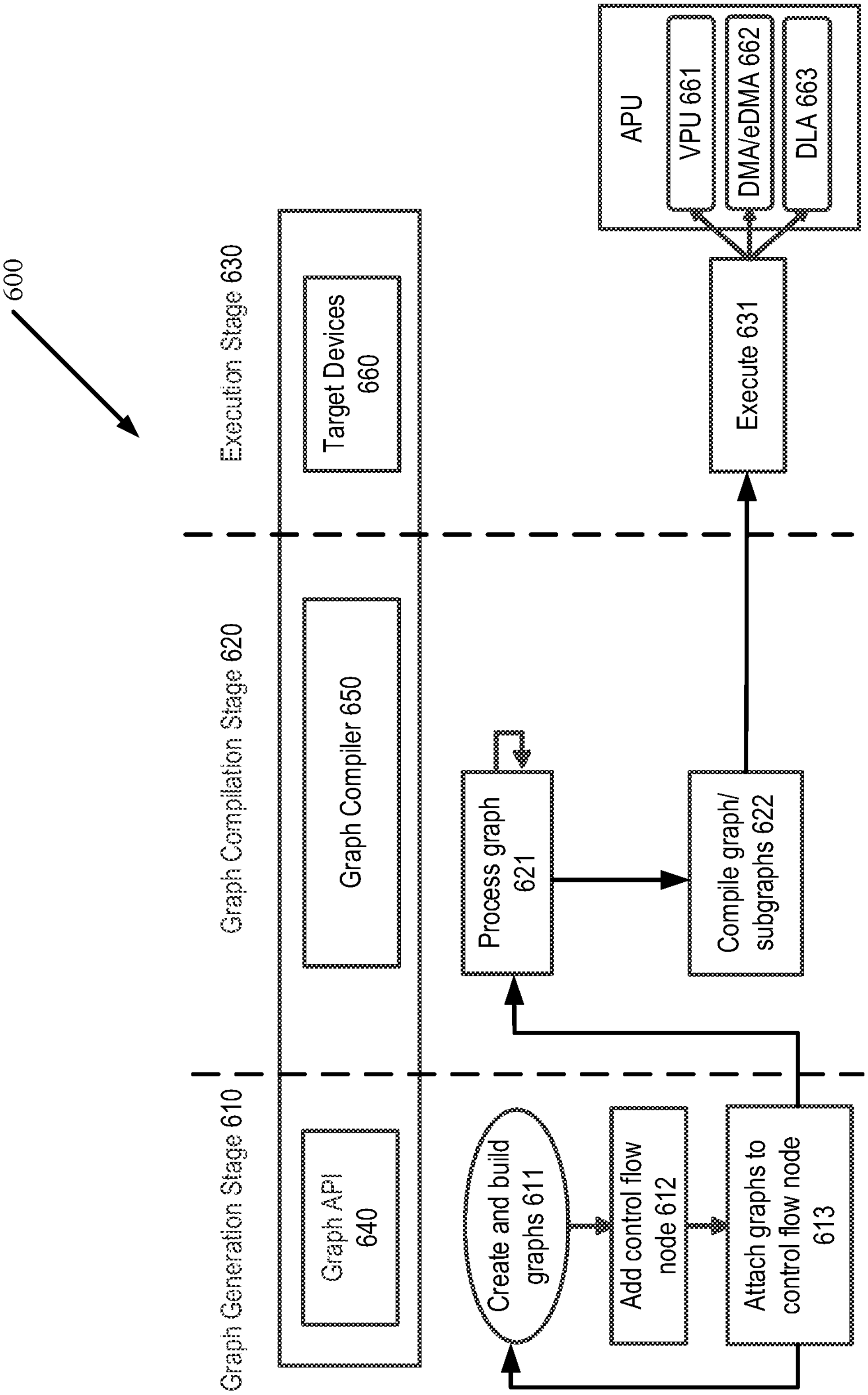
FIG. 6 is a diagram illustrating a process for processing a multi-level graph that includes a control flow node according to one embodiment.

FIG. 6 is a diagram illustrating a process 600 for processing a multi-level graph that includes a control flow node according to one embodiment. Process 600 includes three stages: a graph generation stage 610, a graph compilation stage 620, and an execution stage 630. In graph generation stage 610, a software developer may direct a system, through the use of a graph API 640, to create a graph and build the graph by adding nodes at step 611. In one embodiment, graph API 640 may provide API_IF 38 in FIG. 3 and API_WHILE 58 in FIG. 5. When a node is added to the graph, a buffer is attached to the node to store the code and parameters associated with the node. Thus, in the description herein, it is understood that the code contained in a node is stored in a buffer attached to the node. At step 612, a control flow node is added. At step 613, at least some of the graphs built at step 611 are attached to the control flow node. Non-limiting examples of the graphs built at step 611 include then_graph, else_graph, condition_graph, and/or body_graph shown in FIG. 2-FIG. 5. Steps 611-613 may be repeated for each control flow node. Thus, a multi-level graph is generated at graph generation stage 610, where two or more subgraphs are attached to each control flow node.

Following step 613, each node of the multi-level graph is processed at step 621, node by node. In one embodiment, a graph compiler 650 may convert the graph-based code into an intermediate representation. Each node corresponds to a function predefined in a function library. At step 622, graph compiler 650 compiles the multi-level graph into executable code. Process 600 proceeds to execution stage 630 in which target devices 660 execute the executable code at step 631. Non-limiting examples of target devices 660 include a VPU 661, DMA and/or eDMA devices 662, a DLA 663, and the like.

Figure 7:
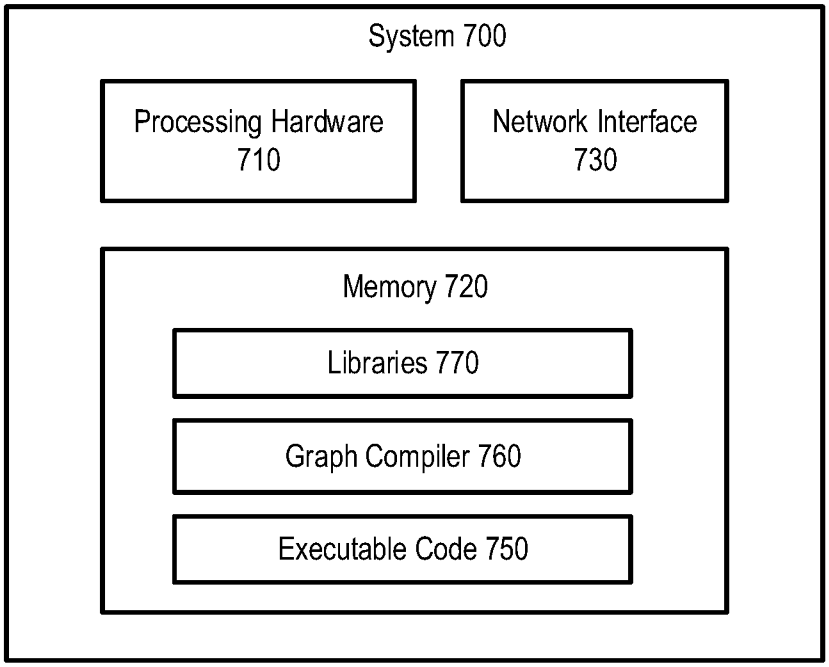
FIG. 7 a block diagram illustrating a system operative to control an image processing flow according to one embodiment

FIG. 7 is a block diagram of a system 700 operative to control an image processing flow according to one embodiment. System 700 may be embodied in many form factors, such as a computer system, a server computer, a mobile device, a handheld device, a wearable device, and the like. System 700 includes processing hardware 710, a memory 720, and a network interface 730. It is understood that system 700 is simplified for illustration; additional hardware and software components are not shown. Non-limiting examples of processing hardware 710 may include one or more processors including but not limited to a CPU on which a graph compiler 760 may run, a graphics processing unit (GPU), a digital signal processor (DSP), an APU, a VPU, a DLA, a DMA/eDMA device, and the like. One or more of the processors, processing units, and/or devices in processing hardware 710 may be the target devices that perform image processing pipeline operations according to executable code 750 compiled from a graph.

Memory 720 may store graph compiler 760, libraries of functions 770, and executable code 750. Different libraries may support different graph-based programming models. Memory 720 may include a dynamic random access memory (DRAM) device, a flash memory device, and/or other volatile or non-volatile memory devices. Graph compiler 760 compiles a graph received through graph API calls into executable code 750 for execution on the target devices. System 700 may receive graph API calls through network interface 730, which may be a wired interface or a wireless interface.

Figure 8:
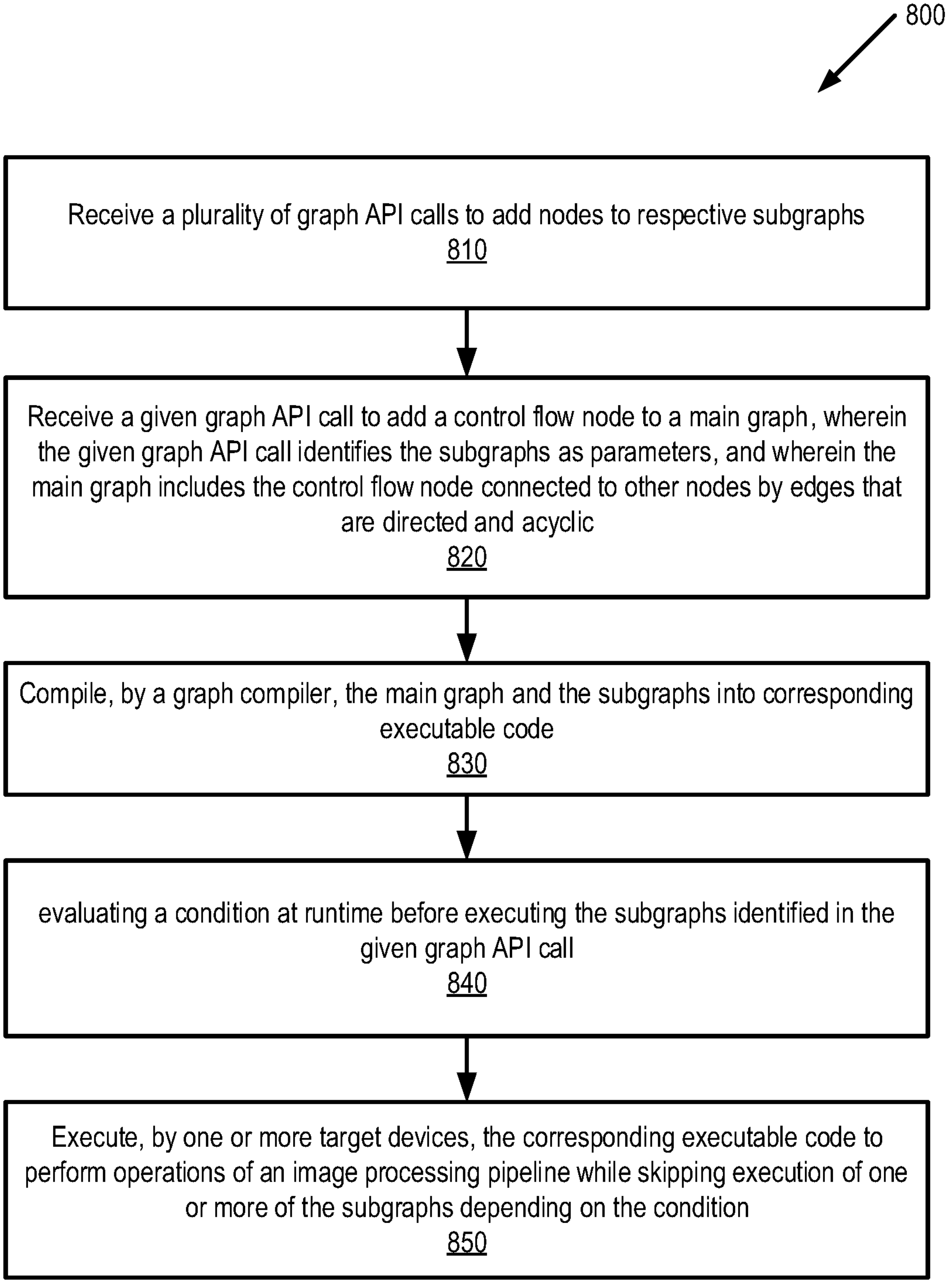
FIG. 8 is a flow diagram illustrating a method for controlling an image processing flow according to one embodiment.

FIG. 8 is a flow diagram illustrating a method 800 for controlling an image processing flow according to one embodiment. In one embodiment, the image processing includes processing a graph that includes a control flow node. In one embodiment, method 800 may be performed by a system such as system 700 in FIG. 7. However, it should be understood that the operations of method 800 can be performed by alternative embodiments, and the embodiment of FIG. 7 can perform operations different from those of method 800.

Method 800 starts with step 810 when a system receives multiple graph API calls to add nodes to respective subgraphs. At step 820, the system further receives a given graph API call to add a control flow node to a main graph. The given graph API call identifies the subgraphs as parameters. The main graph includes the control flow node connected to other nodes by edges that are directed and acyclic. The system at step 830 uses a graph compiler to compile the main graph and the subgraphs into corresponding executable code. The system at step 840 evaluates a condition at runtime before executing the subgraphs identified in the given graph API call. At step 850, the system uses one or more target devices to execute the corresponding executable code to perform operations of an image processing pipeline while skipping the execution of one or more of the subgraphs depending on the condition.

In one embodiment, the parameters of the given graph API call include the main graph, the subgraphs, and an input and an output of the control flow node as the parameters. In one embodiment, an if-condition is evaluated at runtime at the control flow node to determine which one of the conditional branches to execute, where the conditional branches correspond to a then_graph and an else_graph. In one embodiment, a switch-condition is evaluated at runtime at the control flow node to determine which one of the conditional branches to execute, where different conditional branches correspond to different outcomes of the switch-condition.

In another embodiment, a while-condition is evaluated at runtime at a condition node to determine whether the while loop terminates, where the condition node is within a while loop that follows the control flow node. The while-condition at the condition node may be evaluated by comparing a constant with a state that is updated at a body node within the while loop. The condition node is part of a first subgraph and the body node is part of a second subgraph, and both the first subgraph and the second subgraph are attached to the control flow node.

In one embodiment, the main graph is an OpenVX graph. In one embodiment, one or more of the subgraphs include a node corresponding to operations of a multi-layered neural network model.

While the flow diagram of FIG. 8 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for controlling an image processing flow, comprising:

receiving a graph application programming interface (API) call to add a control flow node representing a while loop to a main graph representing an image processing pipeline, the graph API call identifying the control flow node, a condition subgraph for evaluating a condition based on a state, and a body subgraph for updating the state and generating an output of the body subgraph, wherein the main graph is an OpenVX graph, and wherein the body subgraph includes a first node built according to OpenVX and a neural network model node built according to a graph-based programming model different from OpenVX;

compiling, by a graph compiler, the main graph, the condition subgraph, and the body subgraph into executable code; and executing, by one or more target devices in an artificial intelligence (AI) processing unit, the executable code to perform operations of the image processing pipeline, wherein executing the executable code further comprises:

evaluating, by the one or more target devices in the AI processing unit, the condition iteratively according to the executable code of the condition subgraph; and executing the executable code of the body subgraph until the condition is evaluated to be false.

2. The method of claim 1, further comprising:

receiving a second graph API to add a second control flow node to the main graph; and evaluating an if-condition at runtime at the second control flow node to determine which one of conditional branches to execute.

3. The method of claim 2, wherein the conditional branches correspond to a then_graph and an else_graph.

4. The method of claim 1, further comprising:

receiving a second graph API to add a second control flow node to the main graph; and evaluating a switch-condition at runtime at the second control flow node to determine which one of conditional branches to execute, wherein different ones of the conditional branches correspond to different outcomes of the switch-condition.

5. The method of claim 1, further comprising:

determining whether the while loop terminates by evaluating a condition node that follows the control flow node.

6. The method of claim 1, wherein the condition is evaluated by comparing a constant with the state.

7. The method of claim 1, wherein both the condition subgraph and the body subgraph are attached to the control flow node.

8. A system operative to control an image processing flow, comprising:

one or more processors to:

receive a graph application programming interface (API) call to add a control flow node representing a while loop to a main graph representing an image processing pipeline, the graph API call identifies a plurality of parameters including the control flow node, a condition subgraph for evaluating a condition based on a state, and a body subgraph for updating the state and generating an output of the body subgraph, wherein the main graph is an OpenVX graph, and wherein the body subgraph includes a first node built according to Open VX and a neural network model node built according to a graph-based programming model different from Open VX; and compile, by a graph compiler, the main graph, the condition subgraph, and the body subgraph into executable code;

an artificial intelligence (AI) processing unit coupled to the one or more processors and including one or more target devices, the AI processor to execute the executable code to perform operations of the image processing pipeline, the one or more target devices operative to:

evaluate the condition iteratively according to the executable code of the condition subgraph; and execute the executable code of the body subgraph until the condition is evaluated to be false; and memory coupled to the one or more processors and the one or more target devices, the memory to store the graph compiler and the executable code.

9. The system of claim 8, wherein the one or more target devices are further operative to:

evaluate an if-condition at runtime at a second control flow node added to the main graph to determine which one of conditional branches to execute.

10. The system of claim 9, wherein the conditional branches correspond to a then_graph and an else_graph.

11. The system of claim 8, wherein the one or more target devices are further operative to:

evaluate a switch-condition at runtime at a second control flow node added to the main graph to determine which one of conditional branches to execute, wherein different ones of the conditional branches correspond to different outcomes of the switch-condition.

12. The system of claim 8, wherein the one or more target devices are further operative to:

determine whether the while loop terminates by evaluating a condition node that follows the control flow node.

13. The system of claim 8, wherein the condition is evaluated by comparing a constant with the state.

14. The system of claim 8, wherein both the condition subgraph and the body subgraph are attached to the control flow node.

* * * * *